March 20, 1962     A. COLE III     3,026,183
MIXING APPARATUS
Filed Feb. 5, 1960     4 Sheets-Sheet 1
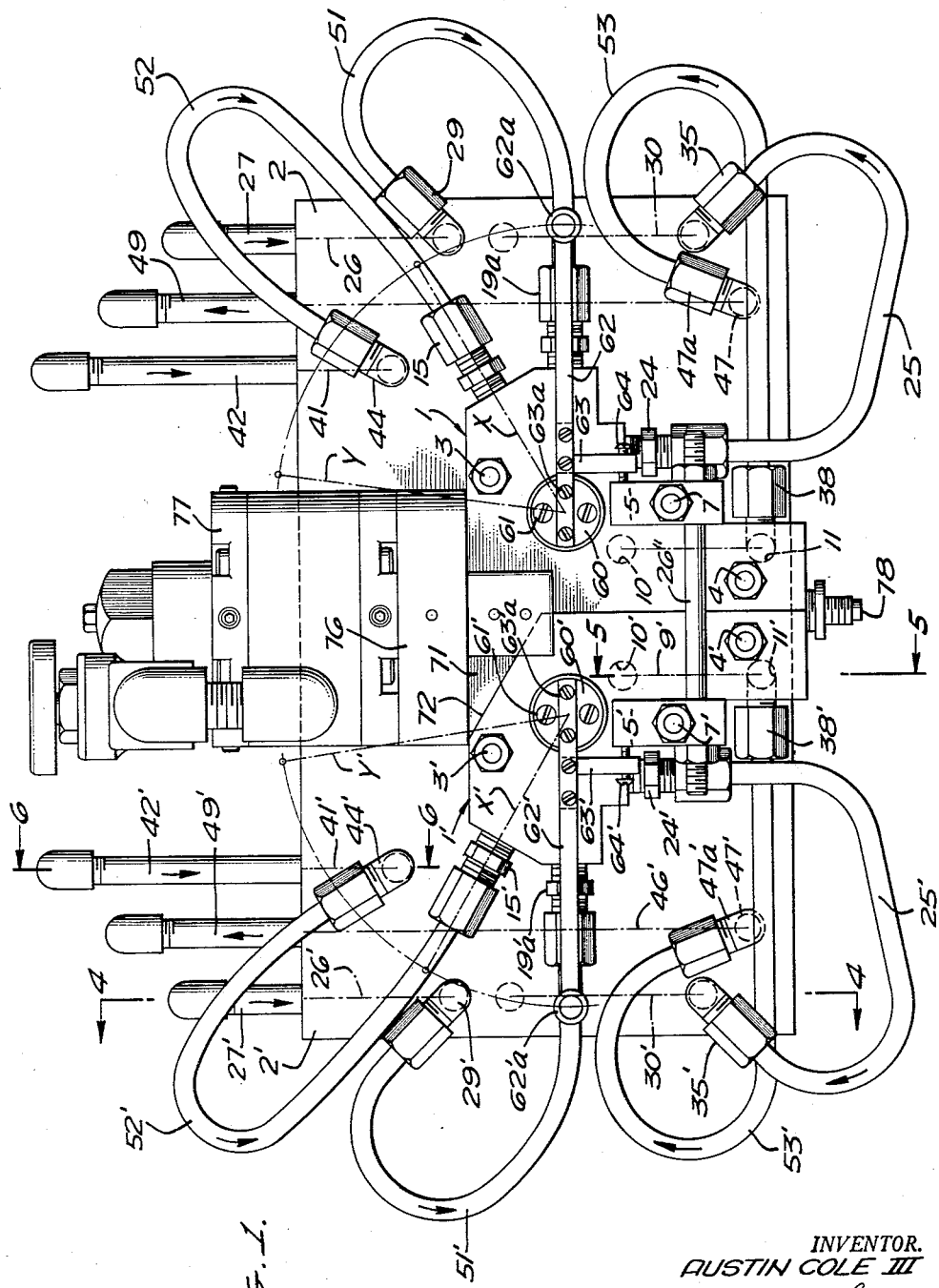
INVENTOR.
AUSTIN COLE III
BY Philip Suskow
Max Gilden
ATTORNEY

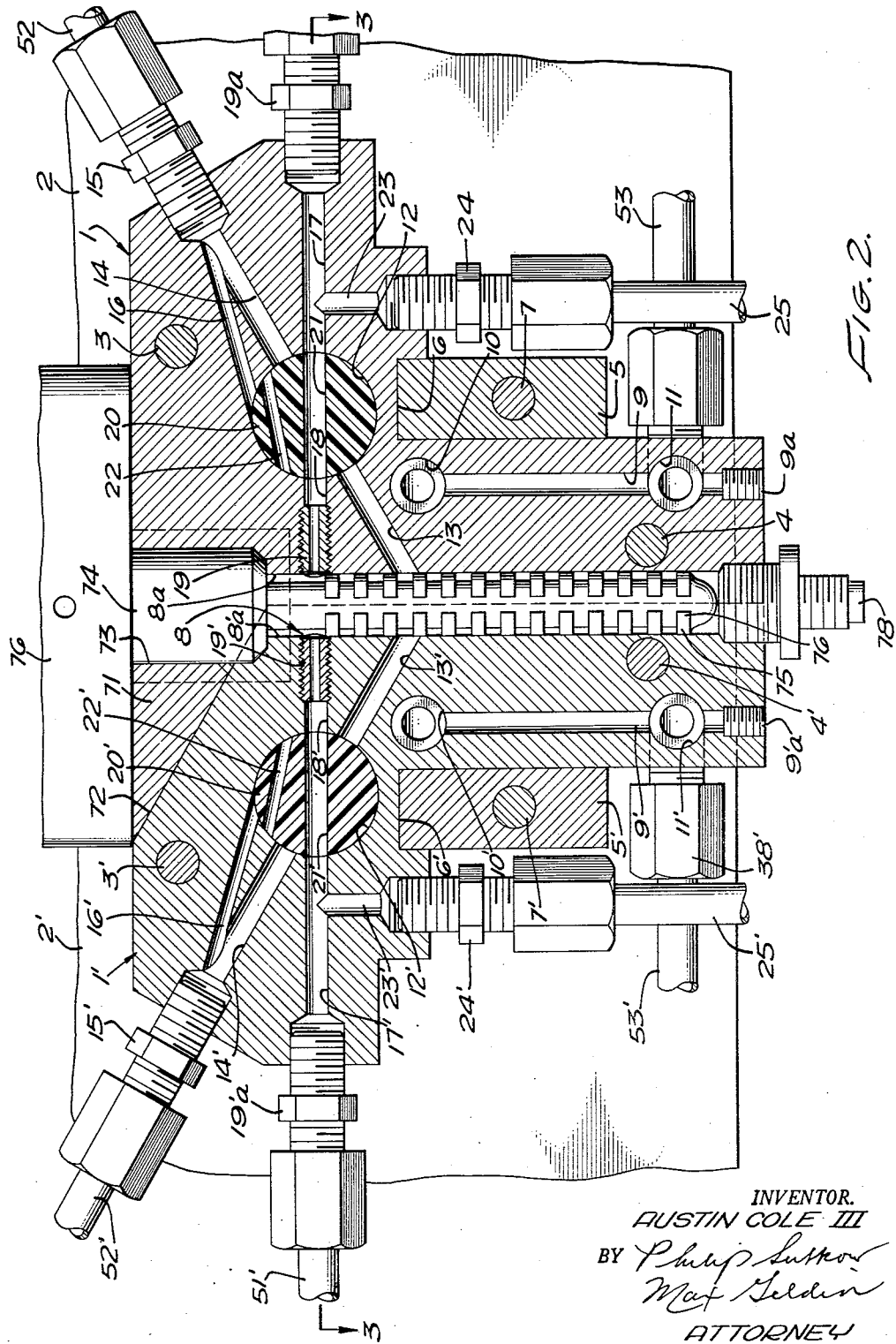

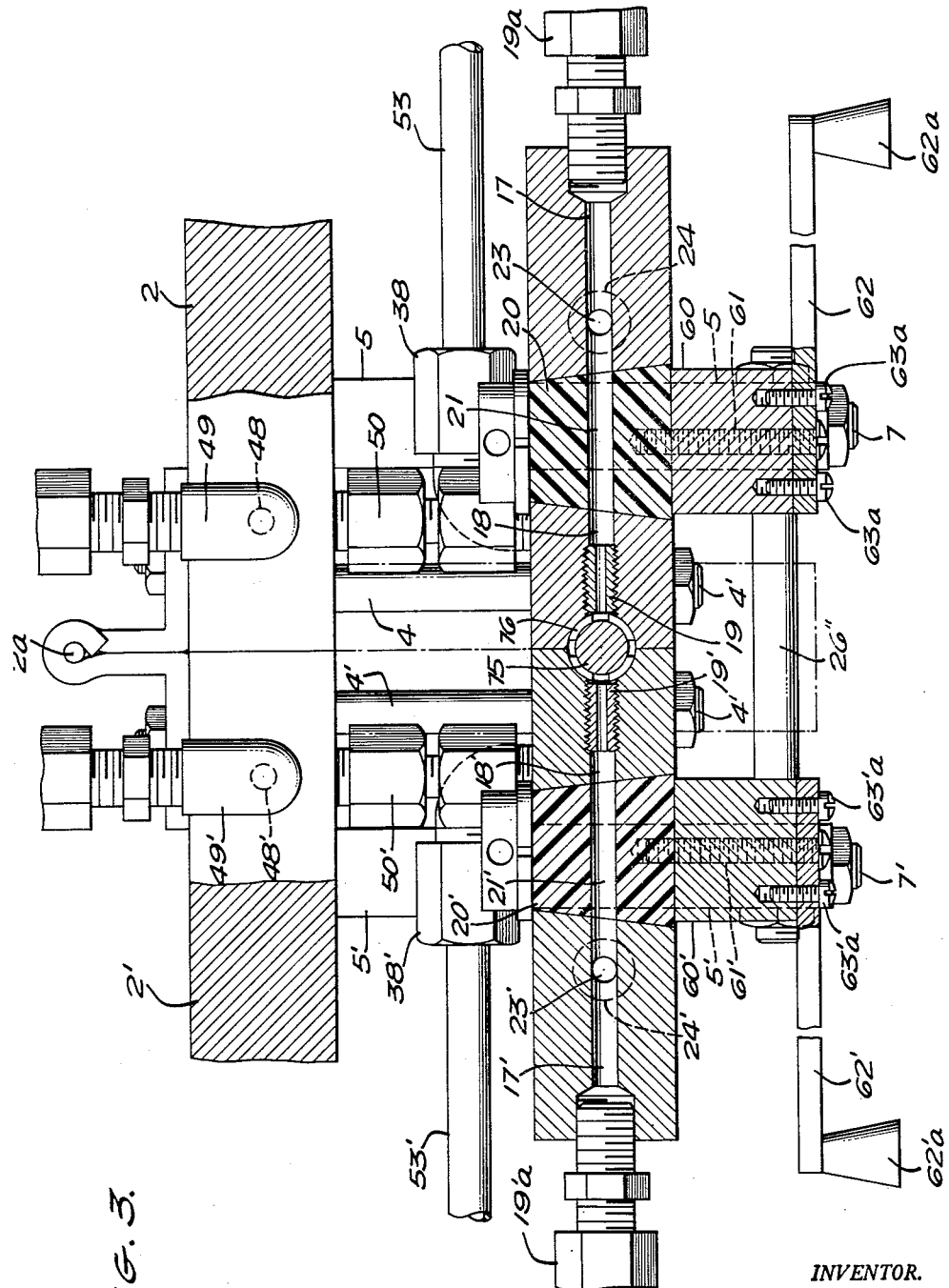

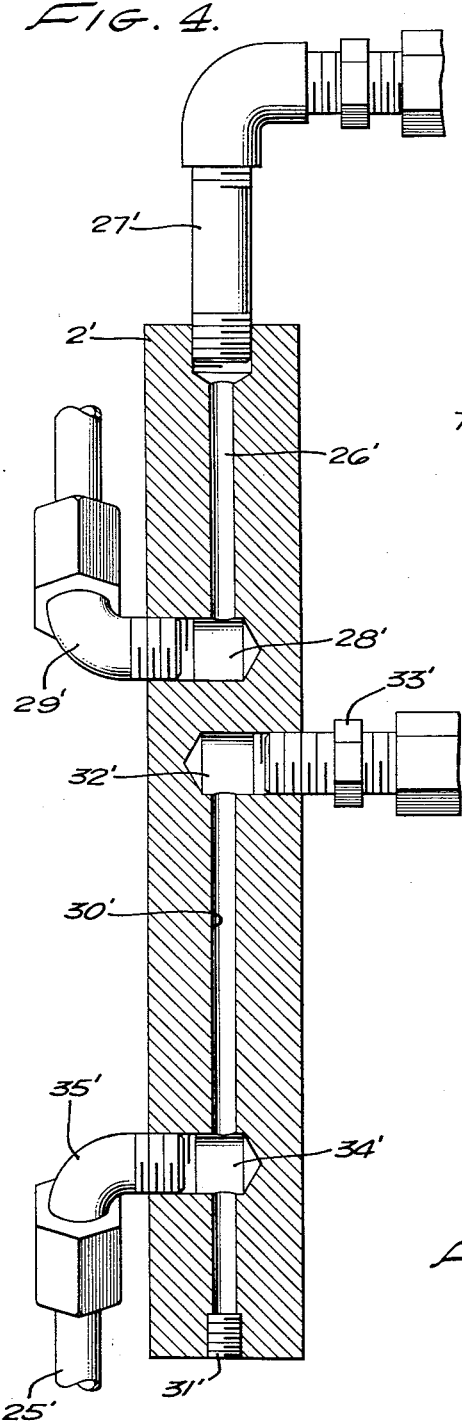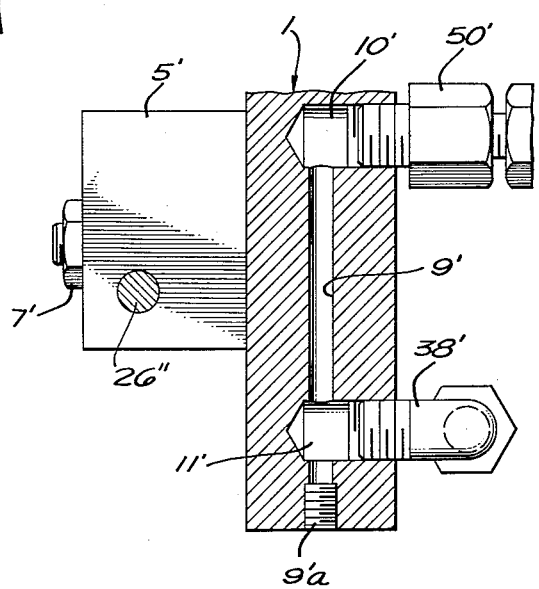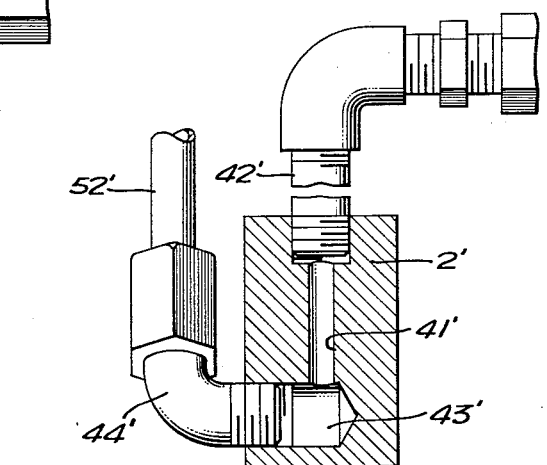

3,026,183
MIXING APPARATUS
Austin Cole III, Hollywood, Calif., assignor, by mesne assignments, to Dayco Corporation, a corporation of Ohio
Filed Feb. 5, 1960, Ser. No. 7,019
15 Claims. (Cl. 23—252)

This invention relates to a mixing head for the purpose of mixing two fluids and it is particularly designed for the mixing of two fluids under low heads, i.e. at low rates of flow. It is more particularly adapted for the mixing of fluids which are to be maintained under controlled temperature conditions, as for example, fluids which either congeal or solidify by chemical interaction at ambient temperatures, or at elevated temperatures at which the mixing occurs in the mixing head of my invention. It is also particularly adapted to the mixing of fluids which interact to cause the formation of higher molecular weight polymers, as for example in the preparation of polyurethane resins. Particular advantage of the mixing head of my invention is that the mixing head may be cleaned and purged of the fluids without interrupting circulation of flow of the fluids to be mixed. This is accomplished by providing for circulation of solvent material through the passageway leading to the mixing zone after shutting off flow of the fluids to be mixed from the mixing zone, and diverting the flow of such fluids for recirculating the fluids back to their sources.

Provision is also made to open the mixing head to clean out the passageways and mixing nozzles without interrupting the flow of the material to be mixed, and a continuing recirculation thereof. Provision is also made for the continued control of temperature in the mixing zone during the cleaning out process.

The preferred embodiment of my invention illustrated in the drawings and described herein below consists of a split mixing head hingedly mounted to permit the separation of the parts. The parts are symmetrical in character, the mating ends being grooved by semicircular grooves, which when the parts are swung together and clamped in position provide a central mixing conduit, cylindrical in character, in which is positioned an agitator shaft connected to a motor carried by one of the parts. Each part is bored with a plurality of passageways communicating with fluid inlets and with the central mixing passageway through a valve. Cleaning material such as solvent is introduced through auxiliary passageways through the valve whereby on proper manipulation of the valve the flow of the fluid to be mixed is interrupted and solvent may be passed through the various passageways of the mixing head in order to clean out any of the material remaining in the passageways. The passageways and valve are designed so that there are substantially no dead spaces for the accumulation of liquids introduced to be mixed. By separating the symmetrical parts on their hinge all parts are accessible for cleaning purposes or for the change of nozzles.

This invention will be further described by reference to the drawings of which:

FIG. 1 is a front view of the mixing head assembled;
FIG. 2 is a vertical section of the mixing head;
FIG. 3 is a section taken on line 3—3 of FIG. 2;
FIG. 4 is a section taken on line 4—4 of FIG. 1;
FIG. 5 is a section taken on line 5—5 of FIG. 1; and
FIG. 6 is a section taken on line 6—6 of FIG. 1.

In the drawings, the two parts of the mixing head which are symmetrical, i.e. are the same in both halves, are marked in the right hand half by unprimed numbers and in the left hand half by like primed numbers. The mixing head is composed of two parts, 1 and 1' which are mounted by studs 3 and 4 one the right hand half and 3' and 4' on the left hand half, on two like plates 2 and 2' that are hingedly connected by a hinge 2a. The halves 1 and 1' are positioned on clamping blocks 5 and 5' by means of locating grooves 6 and 6'. The clamp blocks 5 and 5' are rigidly connected to the plates 2 and 2' respectively by means of studs 7 and 7'. The double ended bolt 26" passing through the blocks 5 and 5' holds the unit in clamped position.

The right hand half of the apparatus, viewing FIG. 1, will now be described, it being understood that the left hand portion carrying primed numbers for the corresponding parts is a mirror image of the right hand portion and is identical thereto except for certain features described below.

The transverse bore 17 passes through member 1 and communicates with a bore 21 in valve 20. The bore 21 communicates with the bore 18 carrying a removable nozzle 19 which communicates with the bore 8 formed by two semi-circular grooves 8a and 8'a, one in part 1 and one in part 1', which when members 1 and 1' are in clamped position form the cylindrical bore 8. The plane of separation of parts 1 and 1' is in a diametrical plane through the bore 8. The bores 17 and 18 are positioned diametrically opposite each other with respect to a conical valve bore 12 in which is positioned the conical valve 20 carrying the diametric bore 21. Two axially aligned bores 14 and 13 pass through part 1 diametrically of the bore 12 and at an acute angle to the bores 17 and 18.

Another bore 16 communicates with the bore 14 and with the valve bore 12. The axis of the bore 16 is in line with a chord of the cross section of the bore 12 and forms an acute angle with the axis of 14 and with the axis of bores 17 and 18. The diametric bore 21 of valve 20 may be aligned with the bores 17 and 18, and a second chordal bore 22 is provided in valve 20, which is blocked by the wall of bore 12 when bore 21 is aligned with the bores 17 and 18. The valve member 20, as will be described more fully below, may be rotated so as to align the bore 21 with the bores 13 and 14, at which time the bore 22 will provide communication between bores 16 and 18.

Fitting 15 is provided at the end of the bore 14 and the fitting 19a is provided at the end of the bore 17. A bore 23 is provided in the part 1, perpendicular to the bore 17 and positioned between the valve 20 and the fitting 19a, and the fitting 24 is provided at the end of the bore 23. A vertical bore 9 is provided in the part 1 with cross bores 11 and 10 provided in the block communicating with the ends of the bore 9 as will be more fully described below. The end of the bore 9 may be closed with a plug 9a.

The part 1 differs from the part 1' in that there is a wedge shaped portion 71 (see FIG. 2) formed integrally with part 1 and overlying the part 1' when the unit is assembled. Part 1' has a complementary planar surface 72 which matches and seats adjacent the underlying wedge shaped surface of 71 on the left hand section. A bore 73 is positioned partly in the member 1 and partly in member 1', forming, when the parts are assembled, a cylindrical bore 73. Positioned on the part 1 and carried over the wedge shaped member 71 is a mounting ring 76 upon which an air motor 77 (see FIG. 1) is carried. The shaft 74 of the motor 77 is rotatably mounted in the bore 73 which forms a journal for the bearing 74, and a mixing shaft 75 carrying a plurality of arcuate lands 76 is positioned in the bore 8. The lands are formed by forming a plurality of circular and parallel flanges and in grooving the flanges with a vertical grove which intersect the flanges to form a plurality of arcuate lands diametrically opposed to each other spaced along the shaft 75. The end of the passageway 8 carries a nozzle 78 screwed into only one of the parts 1 for removing reaction product from the reaction zone within bore 8.

The plates 2 and 2' are mirror images of each other and are bored in like manner. FIGS. 4 and 6 illustrate the bores in plate 2' and identical bores are provided in plate 2. A bore 26' is provided at the top of plate 2' communicating with a nipple 27' and with cross bore 28' in which is mounted an elbow 29'. A second bore 30' is provided in the bottom of plate 2', closed by a plug 31' and carrying a top cross bore 32' communicating with a nipple 33' and with a lower cross bore 34' communicating with an elbow 35'. A third bore illustrated by the dotted line 46' in FIG. 1 and not shown in section communicates with a cross bore 47' in which is positioned an elbow 47'a. A fourth bore 41' (see FIG. 6) is positioned in the top of the plate 2' and communicates with a cross bore 43' which is positioned on the elbow 44'. The top of the bore 41' communicates with the nipple 42'. A fifth vertical bore 48' (see FIG. 3) is positioned in the plate 2', and is bored part way down the plate and communicates with an elbow 49' in the top of the bore and with a cross bore (not shown) which communicates by a fitting 50' with the bore 10'.

One of the fluids to be mixed is introduced through 27' into the bore 26' and through the elbow 29' into the pipe 51' into the fitting 19'a. It passes into the bore 17', bore 21' of valve 20', bore 18' and nozzle 19', into the mixing bore 8. Part of this fluid is recirculated through the bore 23' and through the fitting 24' into the pipe 25' communicating with the elbow 35' and through the bores 34' and 30' and 32' into the fitting 33' to be recirculated to the source of the material entering through 27' by suitable pumping arrangements.

In the same manner, the other of the two fluids to be mixed passes into bore 17, bore 21 of valve 20, bore 18 and nozzle 19, into the cylindrical mixing bore 8, part of such fluid being recirculated to its source via the bore 23 and associated fittings and bores, as described above with respect to the left portion of the mixing head, viewing FIGS. 1 and 2.

Cleaning fluid is introduced through the pipe 42' into the bore 41' and through the bore 43' into the elbow 44' and from the elbow 44' into the pipe 52' and into the fitting 15'. Cleaning fluid is also introduced into the corresponding bores and fittings at the right portion of the mixing head, as viewed in FIGS. 1 and 2.

Temperature controlling fluid such as hot oil is introduced into the elbow 49' through the bore 48' through the cross bore 10' through the bore 9' through the bore 11' into the fitting 38' through the pipe 53' into the fitting 47'a through the bore 47' and the bore 46' into the pipe 49' for recirculation to a temperature controlling unit such as a heater for the recirculating oil. Likewise temperature controlling fluid is introduced via similar bores and fittings at the right portion of the mixing head, as seen in FIGS. 1 and 3, into the bore 9 adjacent the mixing bore 8 and recirculated to a temperature controlling unit.

The valve member 20' is connected to a valve stem 60' (see FIG. 3) by means of studs 61', and the valve may be rotated by the arm 62' and handle 62'a, mounted on the valve stem 60' by means of screws 63'a. The arm 62' carries a depending block 63' (see FIG. 1) and an adjustable stop screw 64' which engages block 5', for positioning the valve arm for proper adjustment.

In operation, assuming that it is desired to mix two fluid reactants in the mixing bore 8, the valves 20 and 20' are in their positions shown in FIG. 2, that is, with the bore 21 of valve 20 in alignment with bores 17 and 18, and with bore 21' in registry with bores 17' and 18'. The valve handle arms 62 and 62' are now in the position shown in full lines in FIG. 1, that is, in their first position. In this position of the valves it will be noted that the communication between bores 14 and 13, and between bores 14' and 13' is shut off by the valves. As described above, the two fluids are then introduced via bores 17, 21, 18 and 19, and via bores 17', 21', 18' and 19' into the mixing bore 8, where the two fluid reactants are mixed aided by the rotation of the stirrer 75. Simultaneously, if desired, hot oil or other temperature controlling fluid can be circulated through bores 9 and 9', as described above, to maintain the temperature in the mixing bore 8 at the desired level.

When it is desired to clean the mixing bore 8 and purge the reaction fluids therefrom, valves 20 and 20' are rotated by handles 62a and 62'a, from their positions shown in FIG. 2, so that bores 22 and 22' are aligned to provide communication between bores 16 and 18, and between bores 16' and 18', respectively, and bores 21 and 21' are thus rotated out of registry with bores 17 and 18, and with bores 17' and 18', respectively, and into registry with bores 13 and 14, and 13' and 14', respectively. The handle arms 62 and 62' are now in the second position indicated by dotted lines X, X' in FIG. 1. Thus, solvent material entering each of the fittings 15 and 15', from pipes 52 and 52', is divided into two streams, one stream, in the case of the solvent passing through fitting 15, proceeding through bores 14, 21 and 13 into conduit 8, and the other stream passing through bores 16, 22 and 18, and nozzle 19 into conduit 8. Likewise two separate streams of fluid solvent pass through bores 14', 21' and 13', and through bores 16', 22' and 18', and nozzle 19', into conduit 8. Flow of solvent is facilitated by the inclination of the bore 14, 21 and 13, and bores 16 and 22, and by the inclination of the corresponding bores 14', 21' and 13', and bores 16' and 22', when the valves 20 and 20' are rotated to the second position described above. During flow of solvent into bore 8, the end of the discharge nozzle 78 can be plugged, e.g., by the finger, to ensure that the solvent completely fills and cleans the entire mixing bore 8. Thus, it will be seen that there are no dead spaces in lines 13 and 13', 18 and 18', nozzles 19 and 19', and the bore 8, which the solvent fluid does not penetrate for cleaning purposes.

With the valves 20 and 20' in the above noted second position, that is, during circulation of solvent into the mixing bore 8, they close off circulation of fluid reactant from line 17 into line 18 and from line 17' into line 18', but circulation of the fluid reactants to and from the source thereof can continue via the bypass bores 23 and 23' during circulation of solvent through bores 13 and 18, and through bores 13' and 18' into conduit 8, as above described. Also, during this period of solvent circulation, circulation of temperature controlling fluid such as hot oil can continue through bores 9 and 9'. An air purge can be used for drying the solvent in the lines after the solvent flow has been shut off.

If it is desired to now open the mixing head, this can be accomplished by rotating the valves 20 and 20' to positions wherein bores 21 and 21' are out of registry with bores 17 and 17' and with bores 14 and 14', respectively, and bores 22 and 22' are out or registry with bores 16 and 16', respectively, closing off flow of both fluid reactants and of solvent or wash fluid to the mixing bore 8. The valve handles 62 and 62' are now in their third position indicated by dotted lines Y, Y' in FIG. 1. While still maintaining circulation of the reactants through the bypass bores 23 and 23', and if desired, while still maintaining flow of temperature controlling fluid such as hot oil through bores 9 and 9', the mixing head can be opened to separate the parts 1 and 1', by removing bolt 26'' from blocks 5 and 5', and rotating the parts 1 and 1' respectively supported on blocks 5 and 5', away from each other on the hinge 2a. The semicircular bores 8a and 8'a forming the bore 8, are now exposed for easy access and further cleaning, if desired, together with their associated bores 13 and 13', 18 and 18', and nozzles 19 and 19'. The nozzle 78 remains on part 1 when part 1' is rotated away.

Lines 17 and 17', 23 and 23', and fittings 19a and

19'a, 24 and 24' can be cleaned externally by shutting off flow of reactants through lines 51 and 51' from the source. Likewise solvent lines 14, 14' and 16, 16', as well as their associated fittings 15 and 15', can be cleaned externally by shutting off flow of solvent through lines 52 and 52'. Also bores 9 and 9' can be readily cleaned by shutting off flow of temperature control fluid through lines 53 and 53', and, if desired, removing plugs 9a and 9'a. Lines 25, 25', 51, 51', 52, 52', 53 and 53' can also be cleaned, removing the associated fittings at opposite ends of these respective lines if desired.

Hence it is seen that the mixing head of the invention is highly versatile in permitting opening of the mixing head for cleaning purposes by a simple operation, while maintaining, if desired, circulation of the fluid reactants through the mixing head and while also maintaining, if desired, flow of hot oil or other temperature controlling fluid through the mixer head.

From the foregoing, it is seen that I have developed a versatile apparatus for mixing fluid reactants, especially when they are to be maintained at a controlled temperature. The apparatus is designed for easy access to the interior thereof for cleaning and repair purposes without interrupting flow of the fluid reactants and temperature controlling fluid through the apparatus. This is important where it is desired to maintain constant temperature in the mixing zone, e.g. when the material therein will set up if allowed to drop in temperature. The valve parts and inlet nozzles can be cleaned out without interrupting flow by proper manipulation of air and solvent lines.

While I have described a particular embodiment of my invention for the purpose of illustration, it should be understood that various modifications and adaptations thereof may be made within the spirit of the invention as set forth in the appended claims.

I claim:

1. Apparatus for mixing fluids which comprises a support, a mixing head mounted on said support and formed of a pair of symmetrical sections, means hingedly mounting said sections with the adjacent ends of said sections in engagement, means on the adjacent engaging ends of said section forming a central mixing conduit when said sections are in engaged position, means forming a first passage in each of said sections communicating with said conduit for circulating a fluid from a source thereof to said conduit, means forming a second passage connected to said first passage in each of said sections for bypassing fluid circulating in said first passage and recirculating said fluid to said source, means forming a third passage in each of said sections communicating with said conduit for circulating a fluid from a source thereof to said conduit, valve means in each of said sections, said valve means being positioned in said first and third passages and operable in one position thereof to permit flow of fluid through said first passage into said conduit while preventing flow of fluid in said third passage, and operable in another position to permit flow of fluid through said third passage into said conduit while bypassing fluid from said first passage into said second passage.

2. Apparatus for mixing fluids which comprises a support, a mixing head mounted on said support and formed of a pair of symmetrical sections, means hingedly mounting said sections for separation thereof, means for clamping said sections in fixed position with the adjacent ends of said sections in engagement, means on the adjacent engaging ends of said section forming a central mixing conduit when said sections are in engaged position, agitating means mounted on said mixing head and positioned in said conduit, means forming a first passage in each of said sections communicating with said conduit for circulating a fluid from a source thereof to said conduit for mixing therein, means forming a second passage connected to said first passage in each of said sections for bypassing fluid circulating in said first passage and recirculating said fluid to said source, means forming a third passage in each of said sections communicating with said conduit for circulating a fluid from a source thereof to said conduit, valve means in each of said sections, said valve means being positioned in said first and third passages and operable in one position thereof to permit flow of fluid through said first passage into said conduit while preventing flow of fluid in said third passage, and operable in another position to permit flow of fluid through said third passage into said conduit while bypassing fluid from said first passage into said second passage.

3. Apparatus for mixing fluids which comprises a support, a mixing head mounted on said support and formed of a pair of symmetrical sections, means hingedly mounting said sections for separation thereof, means for clamping said sections in fixed position with the adjacent ends of said sections in engagement, means on the adjacent engaging ends of said section forming a central mixing conduit when said sections are in engaged position, means forming a first passage in each of said sections communicating with said conduit for circulating a fluid from a source thereof to said conduit for mixing therein, means forming a second passage connected to said first passage in each of said sections for bypassing fluid circulating in said first passage and recirculating said fluid to said source, means forming a third passage in each of said sections communicating with said conduit for circulating a fluid from a source thereof to said conduit, valve means in each of said sections, said valve means being positioned in said first and third passages and operable in one position thereof to permit flow of fluid through said first passage into said conduit while preventing flow of fluid in said third passage, and operable in another position to permit flow of fluid through said third passage into said conduit while bypassing fluid from said first passage into said second passage, and means forming a fourth passage in each of said sections for circulating a heating fluid from a source thereof through each of said sections adjacent said conduit.

4. Apparatus for mixing fluid which comprises a support, a mixing head mounted on said support and formed of a pair of symmetrical sections, means hingedly mounting said sections for separation thereof, means for clamping said sections in fixed position with the adjacent ends of said sections in engagement, means on the adjacent engaging ends of said section forming a central mixing conduit when said sections are in engaged position, agitating means mounted on said mixing head and positioned in said conduit, means forming a first passage in each of said sections communicating with said conduit for circulating a fluid from a source thereof to said conduit for mixing therein, means forming a second passage connected to said first passage in each of said sections for bypassing fluid circulating in said first passage and recirculating said fluid to said source, means forming a third passage in each of said sections communicating with said conduit for circulating a fluid from a source thereof to said conduit, valve means in each of said sections, said valve means being positioned in said first and third passages and operable in one position thereof to permit flow of fluid through said first passage into said conduit while preventing flow of fluid in said third passage, and operable in another position to permit flow of fluid through said third passage into said conduit while bypassing fluid from said first passage into said second passage, and means forming a fourth passage in each of said sections for circulating a heating fluid from a source thereof through each of said sections adjacent said conduit.

5. Apparatus for mixing fluids which comprises a support, a mixing head mounted on said support and formed of a pair of symmetrical sections, means hingedly mounting said sections for separation thereof, said hinging means being positioned at one end of said sections for rotation of said sections outwardly away or inwardly toward each other, means for clamping said sections in fixed position with the adjacent ends of said sections in engagement, means forming a groove along said adjacent ends of said sections, said grooves forming a central mixing conduit when said sections are in engaged position, means forming a first passage in each of said sections communicating with said conduit for circulating a fluid from a source thereof to said conduit for mixing therein, means forming a second passage connected to said first passage in each of said sections for bypassing fluid in said first passage upstream from said conduit and recirculating said fluid to said source, means forming a third passage in each of said sections communicating with said conduit for circulating a fluid from a source thereof to said conduit, said third passage being inclined at an angle to and crossing said first passage downstream of said second passage, a rotatable valve in each of said sections, said valve being positioned at the intersection of said first and third passages, means for rotating said valve, said valve including a channel operable in one position of said valve to register with said first passage and permit flow of fluid through said first passage into said conduit while preventing flow of fluid through said third passage into said conduit, said channel being operable in another position of said valve to register with said third passage to permit flow of fluid through said third passage into said conduit while closing communication of said first passage with said conduit and causing circulation of fluid from said first passage through said second passage.

6. Apparatus for mixing fluids which comprises a support, a mixing head mounted on said support and formed of a pair of symmetrical sections, means hingedly mounting said sections for separation thereof, said hinging means being positioned at one end of said sections for rotation of said sections outwardly away or inwardly toward each other, means for clamping said sections in fixed position with the adjacent ends of said sections in engagement, means forming a groove along said adjacent ends of said sections, said grooves forming a central mixing conduit when said sections are in engaged position, means forming a first passage in each of said sections communicating with said conduit for circulating a fluid from a source thereof to said conduit for mixing therein, means forming a second passage connected to said first passage in each of said sections for bypassing fluid in said first passage upstream from said conduit and recirculating said fluid to said source, means forming a third passage in each of said sections communicating with said conduit for circulating a fluid from a source thereof to said conduit, said third passage being inclined at an angle to and crossing said first passage downstream of said second passage, a rotatable valve in each of said sections, said valve being positioned at the intersection of said first and third passages, means for rotating said valve, said valve including a channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to communicate with said third passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage, and means forming a fourth passage in each of said sections for circulating a heating fluid from a source thereof through each of said sections adjacent said conduit.

7. Apparatus for mixing fluids which comprises a support, a mixing head mounted on said support and formed of a pair of symmetrical sections, means hingedly mounting said sections for separation thereof, said hinging means being positioned at one end of said sections for rotation of said sections outwardly away or inwardly toward each other, means for clamping said sections in fixed position with the adjacent ends of said sections in engagement, means forming a groove along said adjacent ends of said sections, said grooves forming a central mixing conduit when said sections are in engaged position, means forming a first passage in each of said sections communicating with said conduit for circulating a fluid from a source thereof to said conduit for mixing therein, means forming a second passage connected to said first passage in each of said sections bypassing fluid in said first passage upstream from said conduit and recirculating said fluid to said source, means forming a third passage in each of said sections communicating with said conduit for circulating a fluid from a source thereof to said conduit, said third passage being inclined at an angle to and crossing said first passage downstream of said second passage, an auxiliary passage in each of said sections at an angle to said third passage and communicating at one end with said third passage, a rotatable valve in each of said sections, means for rotating said valve, said valve being positioned at the intersection of said first and third passages and at the other end of said auxiliary passage, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to register with said auxiliary passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage.

8. Apparatus as defined in claim 7, including means forming a fourth passage in each of said sections for circulating a heating fluid from a source thereof through each of said sections adjacent said conduit.

9. Apparatus for mixing fluids which comprises a support, a mixing head mounted on said support and formed of a pair of symmetrical sections, means hingedly mounting said sections for separation thereof, said hinging means being positioned at one end of said sections for rotation of said sections outwardly away or inwardly toward each other, means for clamping said sections in fixed position with the adjacent ends of said sections in engagement, means forming a semicircular groove along said adjacent ends of said sections, said grooves forming a central cylindrical mixing conduit when said sections are in engaged position, an agitator mounted on said mixing head and positioned in said conduit, means for actuating said agitator, means forming a first passage in each of said sections communicating with said conduit for circulating a fluid from a source thereof to said conduit for mixing therein, means forming a second passage connected to said first passage in each of said sections bypassing fluid in said first passage upstream from said conduit and recirculating said fluid to said source, means forming a third passage in each of said sections communicating with said conduit for circulating a fluid from a source thereof to said conduit, said third passage being inclined at an acute angle to and crossing said first passage downstream of said second passage, an auxiliary passage in each of said sections at an angle to said third passage and communicating at one end with said third passage, a rotatable valve in each of said sections, means for rotating said valve, said valve being positioned at the intersection of said first and third passages and at the other end of said auxiliary passage, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to register with said auxiliary passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage, and means forming a fourth passage in each of said sections for circulating a heating fluid from a source thereof through each of said sections adjacent said conduit.

10. Apparatus for mixing fluids which comprises a support, a mixing head mounted on said support and formed of a pair of symmetrical sections, a hinge mounted between said sections for rotation of said sections outwardly away or inwardly toward each other, means for clamping said sections in fixed position with the adjacent ends of said sections in engagement, means forming a groove along said adjacent ends of each of said sections, said grooves forming a central mixing conduit when the adjacent ends of said sections are in engaged position, each of said sections being bored to form a first passage in each of said sections communicating with said conduit for circulating a fluid from a source thereof to said conduit for mixing therein, each of said sections being bored to form a second passage communicating with said first passage upstream from said conduit, for bypassing fluid circulating in said first passage and recirculating said fluid to said source, each of said sections being bored to form a third passage communicating with said conduit for circulating wash fluid from a source thereof to said conduit, said third passage being inclined toward said conduit and positioned at an angle to and crossing said first passage downstream of said second passage, a rotatable valve in each of said sections, means for rotating said valve, said valve being positioned at the intersection of said first and third passages, said valve including a channel operable in one position of said valve to register with said first passage and permit flow of fluid through said first passage into said conduit while preventing flow of fluid through said third passage into said conduit, said channel being operable in another position of said valve to register with said third passage to permit flow of fluid through said third passage into said conduit while closing communication of said first passage with said conduit and causing circulation of fluid from said first passage through said second passage.

11. Apparatus for mixing fluids which comprises a support, a mixing head mounted on said support and formed of a pair of symmetrical sections, a hinge mounted between said sections for rotation of said sections outwardly away or inwardly toward each other, means for clamping said sections in fixed position with the adjacent ends of said sections in engagement, means forming a groove along said adjacent ends of each of said sections, said grooves forming a central mixing conduit when the adjacent ends of said sections are in engaged position, each of said sections being bored to form a first passage in each of said sections communicating with said conduit for circulating a fluid from a source thereof to said conduit for mixing therein, each of said sections being bored to form a second passage communicating with said first passage upstream from said conduit, for bypassing fluid circulating in said first passage and recirculating said fluid to said source, each of said sections being bored to form a third passage communicating with said conduit for circulating wash fluid from a source thereof to said conduit, said third passage being inclined toward said conduit and positioned at an angle to and crossing said first passage downstream of said second passage, a rotatable valve in each of said sections, means for rotating said valve, said valve being positioned at the intersection of said first and third passages, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to communicate with said third passage upstream of said valve and with said first passage downstream of said valve to permit flow of fluid through said last mentitoned passage into said conduit, said valve in said last mentioned position thereof closing communication of said first passage upstream from said valve with said conduit and causing circulation of fluid from said first passage through said second passage.

12. Apparatus for mixing fluids which comprises a support, a mixing head mounted on said support and formed of a pair of symmetrical sections, a hinge mounted between said sections for rotation of said sections outwardly away or inwardly toward each other, means for clamping said sections in fixed position with the adjacent ends of said sections in engagement, means forming a semicircular groove along said adjacent ends of each of said sections, said grooves forming a central cylindrical mixing conduit when the adjacent ends of said sections are in engaged position, each of said sections being bored to form a first passage in each of said sections communicating with said conduit for circulating a fluid from a source thereof to said conduit for mixing therein, each of said sections being bored to form a second passage communicating with said first passage upstream from said conduit, for bypassing fluid circulating in said first passage and recirculating said fluid to said source, each of said sections being bored to form a third passage communicating with said conduit for circulating wash fluid from a source thereof to said conduit, said third passage being inclined toward said conduit and positioned at an acute angle to and crossing said first passage downstream of said second passage, each of said sections being bored to form an auxiliary passage at an angle to said third passage and communicating at one end with said third passage, a rotatable valve in each of said sections, means for rotating said valve, said valve being positioned at the intersection of said first and third passages and at the other end of said auxiliary passage, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to register with said auxiliary passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage.

13. Apparatus for mixing fluids which comprises a support, a mixing head mounted on said support and formed of a pair of symmetrical sections, a hinge mounted at the outer end and between said sections for rotation of said sections outwardly away or inwardly toward each other, means for clamping said sections in fixed position with the adjacent ends of said sections in engagement, said last mentioned means including a clamping block positioned adjacent each of said sections, means on each of said sections engaging said clamping blocks, means forming a semicircular groove along said adjacent ends of said sections, said grooves forming a central cylindrical mixing conduit when the adjacent ends of said sections are in engaged position, discharge means at the lower end of said conduit, an agitator mounted on said mixing head and positioned in said conduit, means for actuating said agitator, each of said sections being bored to form a first passage in each of said sections communicating with said conduit for circulating a fluid from a source thereof to said conduit for mixing therein, each of said sections being bored to form a second passage communicating with said first passage upstream from said conduit, for bypassing fluid circulating in said first passage and recirculating said fluid to said source, each of said sections being bored to form a third passage communicating with said conduit for circulating wash fluid from a source thereof to said conduit, said third passage being inclined toward said conduit and positioned at an acute angle to and crossing said first passage downstream of said second passage, each of said sections being bored to form an auxiliary passage at an angle to said third passage and communicating at one end with said third passage, a rotatable valve in each of said sections, means for rotating said valve, said valve being positioned at the intersection of said first and third passages and at the other end of said auxiliary passage, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to register with said auxiliary passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage.

14. Apparatus for mixing fluids which comprises a support, a mixing head mounted on said support and formed of a pair of symmetrical sections, a hinge mounted at the outer end and between said sections for rotation of said sections outwardly away or inwardly toward each other, means for clamping said sections in fixed position with the adjacent ends of said sections in engagement, said last mentioned means including a clamping block positioned adjacent each of said sections, groove means on each of said sections engaging said clamping blocks, and a bolt connecting said clamping blocks, means forming a semicircular groove along said adjacent ends of said sections, said grooves forming a central cylindrical mixing conduit when the adjacent ends of said sections are in engaged position, a discharge nozzle at the lower end of said conduit, an agitator mounted on said mixing head and positioned in said conduit, means for actuating said agitator, each of said sections being bored to form a first passage in each of said sections communicating with said conduit for circulating a fluid from a source thereof to said conduit for mixing therein, each of said sections being bored to form a second passage communicating with said first passage upstream from said conduit, for bypassing fluid circulating in said first passage and recirculating said fluid to said source, each of said sections being bored to form a third passage communicating with said conduit for circulating wash fluid from a source thereof to said conduit, said third passage being inclined toward said conduit and positioned at an acute angle to and crossing said first passage downstream of said second passage, each of said sections being bored to form an auxiliary passage at an angle to said third passage and communicating at one end with said third passage, a rotatable valve in each of said sections, means for rotating said valve, said valve being positioned at the intersection of said first and third passages and at the other end of said auxiliary passage, said valve including a first channel operable in one position of said valve to register with said first passage and permit flow of fluid through said first passage into said conduit while preventing flow of fluid through said third passage into said conduit, said valve including a second channel positioned at an angle to said first channel, said first channel being operable in another position of said valve to register with said third passage upstream and downstream of said valve to permit flow of fluid through said third passage into said conduit, said second channel in said last mentioned position of said valve being operable to register with said auxiliary passage upstream of said valve and with said first passage downstream of said valve to permit flow of fluid through said last mentioned passage into said conduit, said valve in said last mentioned position thereof closing communication of said first passage upstream from said valve with said conduit and causing circulation of fluid from said first passage through said second passage.

15. Apparatus for mixing fluid which comprises a support, a mixing head mounted on said support and formed of a pair of symmetrical sections, means hingedly mounting said sections with the adjacent ends of said sections in engagement, means on the adjacent engaging ends of said sections forming a central mixing conduit when said sections are in engaged position, means forming a first passage in each of said sections communicating with said conduit for circulating a fluid from a source thereof to said conduit, means forming a second passage connected to said first passage in each of said sections for bypassing fluid circulating in said first passage and recirculating said fluid to said source, means forming a third passage in each of said sections communicating with said conduit for circulating a fluid from a source thereof to said conduit, valve means in each of said sections, said valve means being positioned in said first and third passages and operable in one position thereof to permit flow of fluid through said first passage into said conduit while preventing flow of fluid in said third passage, and operable in another position to permit flow of fluid through said third passage into said conduit while bypassing fluid from said first passage into said second passage, and removable fittings at an end of each of said passages for cleaning said passages when said sections are separated from each other on said hinge means.

References Cited in the file of this patent

UNITED STATES PATENTS

| | | |
|---|---|---|
| 921,361 | Chambers | May 11, 1909 |
| 2,768,405 | Mineah | Oct. 30, 1956 |
| 2,868,518 | Corby et al. | Jan. 13, 1959 |